Feb. 1, 1949.  G. A. LYON  2,460,784
WHEEL COVER
Filed April 10, 1944
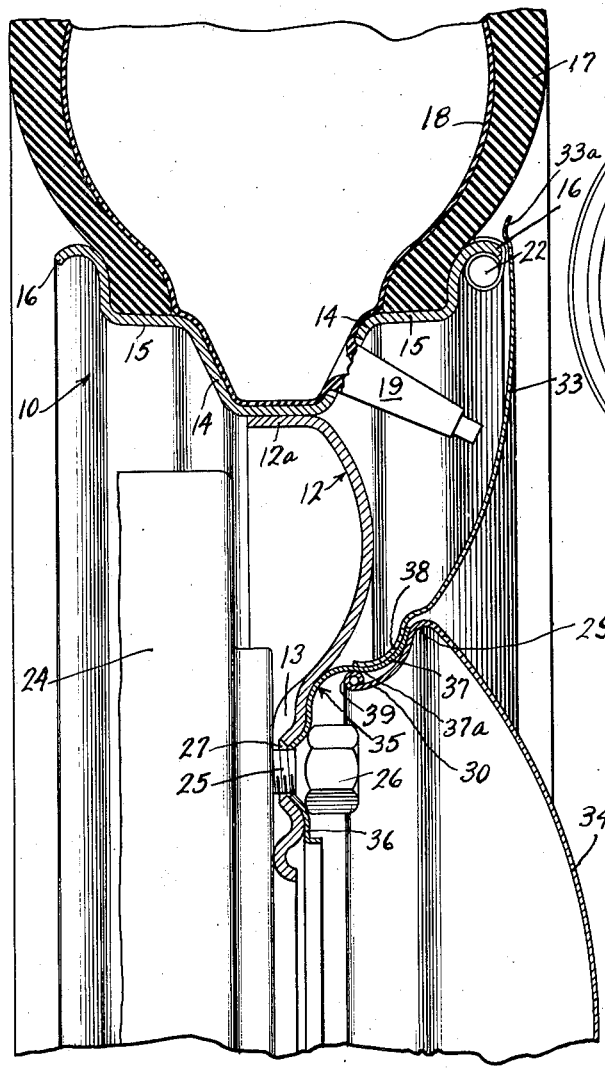
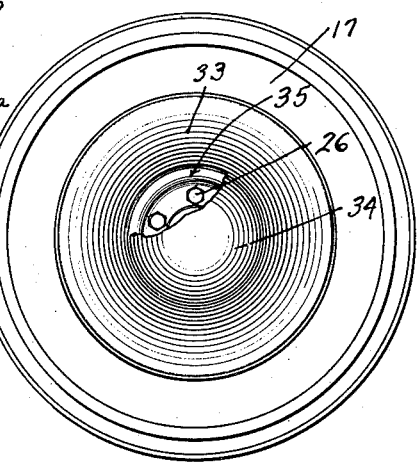
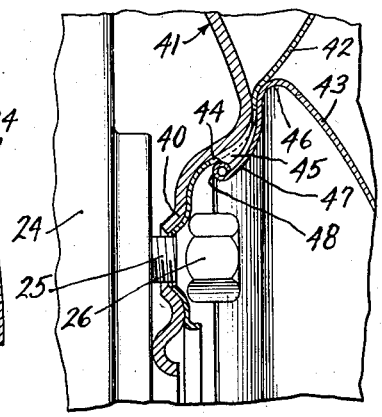
Inventor
GEORGE ALBERT LYON Patented Feb. 1, 1949

2,460,784

UNITED STATES PATENT OFFICE 2,460,784

WHEEL COVER

George Albert Lyon, Allenhurst, N. J.

Application April 10, 1944, Serial No. 530,355

12 Claims. (Cl. 301—37)

This invention is directed to an improved wheel structure and relates more particularly to an improved arrangement for securing and retaining a cover assembly thereon.

It is an object of the present invention to provide an assembly whereby the cover of a wheel structure is maintained thereon by the same attachment means which is utilized to retain the wheel upon a vehicle with which the wheel is associated.

Still another object of the present invention is to provide an improved arrangement for maintaining a multi-part cover assembly over the entire outer side of a wheel structure, the radially outer part of the cover being resiliently, locally, temporarily flexible to be flexed outwardly and away from the wheel to render the rear side thereof and appurtenances therebehind accessible and the central circular hub cap simulating cover part being readily and easily removable to afford removal of the wheel from a vehicle and also to afford removal of the remaining portion of the cover from the wheel if such is desired.

It is another object of the present invention to provide for disposition over the outer side of a wheel structure, an improved cover assembly having a radially outer part formed from synthetic plastic material so as to be resiliently distortable and yet self-sustaining as to form whereby it will immediately snap back into normal configuration when distorting pressures are relieved therefrom, this cover portion being arranged to extend from the radially outer extremity of the wheel, radially inwardly, and to simulate the curvature of the side wall of a tire in the wheel, thereby to give the appearance of being a continuation of the side wall of the tire and to appear as a massive white side wall of a tire on a wheel of minimum dimensions, when colored white.

It is another important object of the present invention to provide a cover assembly for disposition over the outer side of a wheel, which assembly includes a radially outer cover part attached to the wheel by means of bolts which secure the wheel to the vehicle, there also being provided a central hub cap cover member maintained on the wheel by virtue of an attachment to the radially inner part of the first named cover member.

It is another object of the present invention to provide an improved cover assembly for disposition over the outer side of a wheel structure, which cover assembly comprises an outer cover member having a radially inner part secured to the wheel and having an intermediate portion conformed to the configuration of the wheel and provided with apertures through which protuberances on the wheel may extend, these protuberances being arranged to detachably engage a central cover member whereby the latter is held onto the wheel and also serves to press the outer cover member against the outer surface of the wheel.

In accordance with the general features of the present invention there is provided herein a multi-part cover assembly having a radially outer cover member provided with a radially inner portion adapted to receive wheel bolts and adapted to be secured to the wheel by the respective nuts attached to the wheel bolts, this cover being configurated to detachably receive a central circular cover member to provide overall coverage for the wheel structure.

In accordance with the general features of one form of the invention there is provided herein a wheel structure having a tire rim and a central load bearing portion provided with bolt apertures for receiving wheel bolts, and a cover assembly including a relatively rigid retaining annulus provided with wheel bolt receiving apertures and also provided with a radially outer part for retainingly engaging a radially outwardly extending cover part and for retainingly engaging a central circular hub cap cover part, this retaining member being arranged to be secured unto the wheel by virtue of the bolts which maintain the wheel upon the vehicle.

In accordance with still another form of the invention shown herein there is provided a wheel structure including a central load bearing portion having circularly arranged, circumferentially spaced protuberances on the axially outer surface thereof and a multi-part cover assembly including a radially outer cover member having a radially inner portion arranged to receive wheel attaching bolts and also having apertures spaced to be aligned with said protuberances so that the latter may extend therethrough, said protuberances being arranged to retainingly receive a snap-on portion of a central hub cap member, whereby the latter is not only held on the wheel by the protuberances but also serves to pressingly force the radially outer cover member tightly against the wheel structure so that if the outer cover is made of a resilient, compressible plastic material it serves as a cushion between the central circular cover member and the metallic wheel to prevent the development of vibration and rattle.

It is another object of the present invention to provide a multi-part cover assembly including an annular retaining member having a radially inner part arranged to be attached to the wheel by means of wheel bolts that secure the wheel to the vehicle and also having a radially outer part arranged to retainingly receive the radially inner portion of the radially outer cover member and the radially outer portion of the radially inner cover member, thereby to provide a common anchorage for the plurality of cover parts.

Other objects and advantages of the invention will become apparent from the following description and accompanying drawings in which:

Figure 1 is a side elevational view with a part broken away for illustrative purposes, of the wheel embodying a form of my invention;

Figure 2 is a fragmentary enlarged cross-sectional view of a wheel structure embodying the form of my invention shown in Figure 1; and Figure 3 is an enlarged, fragmentary cross-sectional view of a modified form of my invention.

It will be understood that the embodiments shown herein are for illustrative purposes only and may be changed or modified without departing from the spirit and scope of the invention as set forth in the appended claims.

As shown in Figures 1 and 2, the wheel structure includes a tire rim 10 having a base flange 11 and a central load bearing portion 12 provided with a peripheral, axially inwardly extending flange 12a which may be secured to the base flange 11 by means of welding or riveting or the like.

The central load bearing portion 12 is further provided with a radially inner bolt-on flange 13 while the tire rim 10 is provided with opposite side wall flanges 14, opposite intermediate flanges 15 and opposite edge portions 16, between which may be disposed a tire 17 having an inner tube 18 provided with a tire valve stem 19 which extends through a suitable aligned aperture in the respective side wall flange 14 of the tire rim 10.

The cover assembly shown herein includes a radially outer annular cover member 33 and a central circular hub cap simulating cover member 34. The cover member 33 is preferably constructed from relatively thin sheet synthetic plastic material so as to be resiliently, locally flexible, whereby the radially outer part thereof may be flexed axially outwardly and radially inwardly away from the wheel to render the rear side thereof accessible to afford manipulation of wheel balancing weights 22 attached to the edge portion 16 of the tire rim, to attach a nozzle of an air hose to the valve stem 19 or for servicing other appurtenances associated with the wheel and housed therebehind. Also this cover member 33 is provided with a cross-sectional expanse of such magnitude that it extends from the radially outer extremity of the wheel, radially inwardly to a point in the vicinity of the bolt-on flange 13, the curvature thereof being such that the cover appears to be a continuation of the side wall of the tire when secured to the wheel. If desired, the cover may be provided at the radially outer edge with a slightly outwardly flared portion 33a which extends beyond the edge portion 16 to conceal the junction between the tire 17 and the tire rim.

To the end that the cover 33 may be secured in a satisfactory manner to the wheel structure, the radially inner margin thereof is associated with the wheel structure in a manner to be described presently.

As shown in Figure 2 the entire wheel structure may be secured to a brake drum 24 of the vehicle. To this end the brake drum is provided with axially outwardly extending bolts 25 which are externally threaded to receive wheel nuts 26, it being understood that the bolts 25 are circularly arranged and circumferentially spaced in the usual manner. To the end that the wheel may accommodate the bolts 25, the central load bearing portion and particularly the bolt-on flange 13 thereof is provided with bolt apertures 27 which are aligned with the bolts 25 to receive the same so that when nuts 26 are screwed onto the bolts the central load bearing portion 12 of the wheel is pressed tightly against the brake drum and held in this position.

Preferably the radially inner part of the cover member 33 is supported and reinforced by virtue of the fact that the hub cap simulating cover member 34 is desirably made from sheet steel or the like. This central cover member 34 which simulates a hub cap is provided with an intermediate, radially outwardly protruding shoulder portion 29 which is defined on the axially outer side thereof by a generally radially inwardly, axially inwardly, obliquely disposed snap-on flange 30 terminating in a snap-on bead 39.

As best shown in Fig. 2, the cover assembly includes a multi-part, radially outer plastic cover member 33 comprising a radially outer plastic part and a radially inner retaining part to be described. The cover assembly is completed by the provision of a centrally, circular metal hub cap simulating cover 34. In this construction a novel, radially inner retaining part 35 of the cover member 33 comprises a retaining annulus which not only retains the cover members 33 and 34 upon the wheel but also serves to aid in rigidifying the complementary, frangible plastic cover part 33.

This retaining annulus, as shown at 35, is generally L shape in cross section having a radially inwardly extending leg 36 and a generally axially outwardly extending leg 37. This retaining annulus 35 is preferably formed from thin sheet steel by rolling or stamping and the leg 36 thereof is formed to conform to the configuration of the bolt-on flange 13 of the wheel structure and is also provided with apertures susceptible of alignment with the bolt apertures 27 in the bolt-on flange 13 of the wheel. The leg 37 of the retaining annulus 35 is provided with a marginal portion having an inner part which is circularly depressed radially inwardly a slight amount to provide a shoulder 37a for the cover member 34 in a manner to be described presently and an outer part which extends generally radially outwardly to provide a retaining shoulder for the cover part 33.

The cover part 33 is provided at the radially inner margin thereof with a curvate portion 38 arranged to nestingly engage in the leg 37 of the retaining part 35 and the cover 33 is preferably attached to the retaining part by being slipped thereon from the rear side thereof before attachment to the wheel takes place. After the cover member 33 has been disposed in the position shown in Figure 2, the retaining annulus 35 is aligned concentrically with the wheel so that the bolt holes therein are aligned with the bolt holes 27 of the bolt-on flange 13 of the wheel. The bolts are then inserted through the bolt holes of the cover assembly and the nuts 26 are screwed into the position shown so that the outer cover 33 including the retaining annulus 35 are tightly maintained upon the wheel. It will be seen that the portion of the wheel and the appurtenances concealed by the cover member 33 are readily accessible by flexure of that cover from the outer edge thereof.

In the construction of Figure 2 the cover member 34 and particularly the snap-on bead 39 thereof is cammed radially inwardly against the shouldered portion 37a of cover 33 and behind the same by axial inward movement, whereby it is securely, yet detachably retained upon the wheel structure. With this arrangement it will be seen that the cover member 34 serves admirably as a back-up member for the leg 37 of the retaining part 35 and the radially inner portion 38 of the cover 33.

It should be noted that removal of the hub cap member 34 may be effected in the usual way by inserting the end of a pry-off tool or screwdriver under the outer edge of the member 34 and thereby forcibly prying or camming the bead 39 over and off of the shoulder 37a. Upon removal of the hub cap access may be had to the wheel bolts to remove either or both the annulus 35 and the wheel from attachment to the brake drum assembly.

In the construction of Figure 3 the brake drum 24 having the wheel bolts 25 and nuts 26 associated therewith is arranged to receive the bolt-on flange 40 of a central load bearing portion 41 of a wheel in the manner described in connection with the constructions of Figures 1 and 2.

In this construction of Figure 3 the cover assembly includes a radially outer cover member 42 and a central circular hub cap simulating cover member 43. The cover member 42 preferably possesses the same attributes as cover member 33 of Figures 1 and 2 and furthermore is provided with a plurality of circularly arranged, circumferentially spaced apertures 44 through which aligned protuberances 45 on the outer side of the central load bearing portion 41 of the wheel may extend. These protuberances may be of any suitable number, such as three to five, and include axially outer cam surfaces and axially inner shoulders.

The cover member 43 is constructed similarly to member 34 in Figure 2 in that it includes a radially outer portion 46 and a generally axially inwardly extending snap-on flange 47 terminating in a snap-on bead 48.

In assembling the structure of Figure 3 the cover 42 is first aligned concentrically with the wheel structure so that wheel bolt apertures therein are aligned with the wheel bolts 25 whereupon the apertures 44 will be aligned with the respective protuberances 45 of the wheel. Thereafter the nuts 26 are screwed into the position shown in the drawings, whereby the cover 42 is securely maintained upon the wheel structure in conforming configuration to the bolt-on flange 40 of the central load bearing portion 41 of the wheel. Thereafter the central circular hub cap simulating member 43 is aligned concentrically with the central part of the wheel structure and urged axially inwardly so that the snap-on bead 48 rides over the axially outer cam surfaces of the protuberances 45 until it comes to rest upon the axially inner shoulders thereof. When in this position it will be seen that the radially outer extremity 46 of the central cover member 43 is drawn pressingly inwardly against the adjacent portion of the cover member 42, thereby to urge the adjacent portion of the cover 42 into conforming configuration with the outer surface of the wheel. It will be seen that the resilient cover member 42 acts as a resilient, compressible gasket or cushion for the nuts 26 and also serves as a cushion for the cover member 43. Under these circumstances, it will be seen that the metallic parts of the structure, namely, the bolt-on flange 40, nuts 26 and the central cover member 43 are all separated from one another by means of the resilient, intervening portions of the cover member 42. In this manner rattling and vibration of the parts during use of the vehicle is obviated.

In conclusion it will be perceived that in both forms of the invention the outer flexible annular cover member 33—42 may be manipulated to afford access to the rear thereof without necessitating the removal of any part of the cover assembly from the wheel. In addition, the cross-sectional contour of this outer annular member is such that it appears, in use, to be a continuation of the outer side wall of the tire 17. In other words, this annular member causes the tire to appear to extend clear down to the central hub cap member 34—43.

In addition, in each form of the invention the central hub cap member 34—43 may be removed to afford access to the wheel bolts when it is desired to remove either or both the outer cover member and the wheel from the support on the vehicle.

Also in both forms the inner margin of the outer plastic cover member 33—42 has the backing of a metal part. In the first form the cover 33 is backed up by the metal annulus 37. In the second form the inner margin of the plastic cover member 42 is backed up by the nose of the wheel body part 41. The arrangement of both assemblies is such, by reason of the mounting of the assembly, as to minimize rattle between the parts.

What I claim is:

1. The combination with a wheel structure having a central load bearing portion constructed at a radially inner part thereof for attachment to a vehicle and having attachment means for securing the wheel to a vehicle, and a circular cover member formed from resiliently flexible, yet form sustaining material, whereby the outer edge thereof may be temporarily flexed to render the rear side thereof accessible, and a retaining member of relatively rigid material interconnected with the inner margin of said cover member and including at the radially inner part thereof, a portion formed to nest in the attachment part of the central load bearing portion and constructed to be attached thereto by said attachment means as said means secures the wheel to the vehicle.

2. As an article of manufacture, an annular cover structure for disposition over the outer side of a wheel structure including a tire rim and a central load bearing portion provided at a radially inner part thereof with bolt apertures for receiving wheel attaching bolts extending from a part of a vehicle with which the wheel is associated, said cover structure comprising cooperating radially inner and outer parts having a cross-sectional expanse whereby the outer part may have its outer edge disposed in the vicinity of the radially outer extremity of the wheel to which it is secured and whereby the radially inner part may extend radially inwardly to a point adjacent the portion of the wheel containing the bolt apertures, said radially inner part of the cover structure being provided with bolt apertures for alignment with the apertures in the wheel, thereby to be securable to the outer side of the wheel when the wheel is secured to the vehicle, said cover structure also including at said radially inner part thereof, radially inwardly facing shouldered means for detachably retaining resilient snap-on means of a central cover member, and a central circular cover member detachably retained by said shouldered means on said annular cover structure.

3. In a cover assembly for disposition over the outer side of a wheel structure having a tire rim and a central load bearing portion provided with apertures for receiving wheel bolts of a vehicle with which the wheel is associated, a radially outer, annular cover member formed from resiliently flexible plastic material which is self-sustaining as to form, said cover member having its outer margin disposed in the vicinity of the radially outer extremity of the wheel; an annular retaining member having a radially outer marginal part arranged to retainingly engage the radially inner marginal part of said cover member and having the inner margin thereof disposed over the apertured part of the central load bearing portion, said inner margin of the retaining member having aligned apertures therein to receive the vehicle wheel bolts whereby said retaining member with the cover member is secured to the wheel when the wheel is secured to the vehicle, the radially outer part of the retaining member being formed to provide a circular, radially inwardly disposed shoulder; and a central, circular cover member having a snap-on bead; said shouldered portion of the retaining member being arranged to detachably receive the snap-on bead of said central cover member to maintain the same on the wheel structure.

4. In a cover assembly for disposition over the outer side of a wheel structure having a tire rim and a central load bearing portion provided with apertures for receiving wheel bolts of a vehicle with which the wheel may be associated, a radially outer, annular cover member formed from resiliently flexible plastic material which is self-sustaining as to form, said cover member having its outer margin disposed in the vicinity of the radially outer extremity of the wheel, and an annular retaining member having a radially outer marginal part arranged to engage the radially inner marginal part of said cover member retainingly and having the inner margin thereof disposed for disposition over the apertured part of the central load bearing portion, said inner margin of the retaining member having aligned apertures therein to receive the vehicle wheel bolts whereby said retaining member with the cover member is secured to the wheel when the wheel is secured to the vehicle.

5. In a cover assembly for disposition over the outer side of a wheel structure of the kind including a bolt-on central flange, an annular cover member having a central bolt-on flange arranged to be secured to the wheel structure at the bolt-on flange of the latter, said cover member including a generally axially outwardly extending portion having radially inwardly projecting cover retaining shoulder means, and an inner circular cover member having a formation engageable in snap-on, pry-off relation with said shoulder means and a portion concealing said axially outwardly extending portion of the annular cover member.

6. In a cover assembly for disposition over the outer side of a vehicle wheel, inner and outer annular cover members, the inner marginal portion of the outer cover member and the radially outer portion of the inner cover member being retainingly interconnected, said inner cover member having hub cap retaining means thereon, and a hub cap retainingly engaging said means in snap-on, pry-off relation and carried by the inner cover member.

7. In a cover assembly for disposition over the outer side of a wheel structure, an outer annular cover member, an inner circular cover member, and an annular retaining member; said retaining member having generally axially inwardly and axially outwardly extending marginal portions, said outer marginal portion comprising a flange having radially outer and radially inner faces and being retainingly engaged on the radially outer face thereof by said outer annular cover member and retainingly engaged on the radially inner face thereof by said inner circular cover member, the generally axially inner marginal portion of said retaining member being retainingly engageable with the wheel.

8. In a wheel structure including a tire rim and a load sustaining body part, the body part having a central bolt-on flange, a cover assembly including an annulus for disposition in covering relation to the tire rim and an adjacent portion of the body part of the wheel, a hub cap for covering the central portion of the wheel, and a cover retaining annulus having an outer portion thereof retainingly engaged by said cover annulus and said hub cap and having an inner portion thereof including a bolt-on flange secured to the bolt-on flange of the body portion of the wheel.

9. A cover assembly for disposition over the outer side of a wheel structure and including, in combination, a cover retaining annulus having a portion thereof arranged for attachment to the wheel and a portion thereof having a generally radially outwardly extending shoulder structure and a generally radially inwardly extending shoulder structure, an outer annular cover member engaging said radially outwardly extending shoulder structure, and an inner circular cover member retainingly engaging said radially inwardly extending shoulder structure, said inner circular cover member extending into substantially concealing relation to the juncture of the cover components.

10. In a cover assembly for disposition over the outer side of a vehicle wheel, a retaining annulus having a generally axially inwardly extending portion adapted for attachment to a wheel and a generally axially outwardly extending portion having a curved terminal part providing a generally radially outwardly extending shoulder facing generally axially inwardly and a curved part axially inwardly from said terminal part providing a generally radially inwardly extending shoulder facing generally axially inwardly, a trim ring member having its radially inner margin retainingly engaged with said terminal shoulder, and a circular inner cover member retainingly engaged with said radially inwardly extending shoulder.

11. In a cover assembly for disposition over the outer side of a wheel structure, inner and outer cover members having generally complementary internesting marginal portions, and a retaining member internested between said complementary internesting portions and extending generally axially inwardly from the juncture of the members for attachment to the wheel.

12. In a cover assembly for disposition over the outer side of a wheel structure, a cover retaining annulus having a generally axially outwardly extending flange, a trim ring retainingly engaging the radially outer side of said flange and extending generally radially outwardly therebeyond, and a circular inner cover member retainingly engaging the radially inner side of said flange and extending in covering relation thereto, said retaining ring having a portion extending generally axially inwardly beyond the juncture of said cover members with said flange and adapted for attachment of the cover assembly to a wheel.

GEORGE ALBERT LYON.

REFERENCES CITED

The following references are of record in the file of this patent:

UNITED STATES PATENTS

| Number | Name | Date |
|---|---|---|
| 1,234,387 | Paugh et al. | July 24, 1917 |
| 1,959,255 | Zerk | May 15, 1934 |
| 2,016,395 | Sinclair | Oct. 8, 1935 |
| 2,157,908 | Lyon | May 9, 1939 |
| 2,166,216 | Lyon | July 18, 1939 |
| 2,167,102 | Burger | July 25, 1939 |
| 2,244,014 | Lyon | June 3, 1941 |
| 2,298,669 | Wood | Oct. 13, 1942 |
| 2,368,254 | Lyon | Jan. 30, 1945 |

FOREIGN PATENTS

| Number | Country | Date |
|---|---|---|
| 626,864 | France | 1927 |